May 6, 1952        R. B. DAVIS        2,595,773
ORCHARD HEATER

Filed Feb. 23, 1949        2 SHEETS—SHEET 1

INVENTOR
RAY B. DAVIS
By Kenway, Jenny, Witter & Hildreth
ATTORNEYS

May 6, 1952 R. B. DAVIS 2,595,773
ORCHARD HEATER
Filed Feb. 23, 1949 2 SHEETS—SHEET 2

INVENTOR
RAY B. DAVIS
By Kenway, Jenney, Witter
& Hildreth
ATTORNEYS

Patented May 6, 1952

2,595,773

UNITED STATES PATENT OFFICE 2,595,773

ORCHARD HEATER

Ray B. Davis, Newton Center, Mass., assignor, by mesne assignments, to Davco Incorporated, Boston, Mass., a corporation of Massachusetts Application February 23, 1949, Serial No. 77,737

2 Claims. (Cl. 47—2)

The present invention relates to orchard heaters and the like, for preventing injury to fruit or vegetable crops during periods of cold or sub-freezing weather.

While various devices for this purpose have heretofore been constructed, it has been found that the results obtained have not been entirely successful. The protection of a fruit or vegetable crop as the temperature falls below freezing generally requires a relatively great amount of heat, which must be well distributed and so moderated that no portions of the field or orchard are exposed to temperatures appreciably above the desired level. Devices hitherto existing have employed various arrangements and combinations of fuel burners and fans or blowers, but, so far as is known, they have not been capable of heat output of the required magnitude for adequate protection of extensive areas.

It is therefore an object of the present invention to provide orchard heating apparatus which may advantageously but not necessarily be of the mobile type for operation while traversing the area to be protected, wherein extremely high heat outputs may be obtained with efficient utilization of fuel, so as to provide and distribute over a wide area a great volume of heated air, adequate to effect a temperature rise of several degrees in a short period of time.

A further object is to provide in an orchard heater of extremely high total heat output, a construction and arrangement wherein the heated air discharged from the device is, even in fairly close proximity to the point of discharge, of relatively moderate temperature, so as to avoid the possibility of igniting combustible material or causing damage to fruit or vegetation in the path of the discharge.

Other objects of the invention concern orchard heating apparatus of improved construction and mode of operation, capable of quick and certain starting, and dependable and effective in operation with a minimum of attention, so as to permit the device to remain in operation for extended periods of time while being moved through and around the region to be protected.

Figure 1:
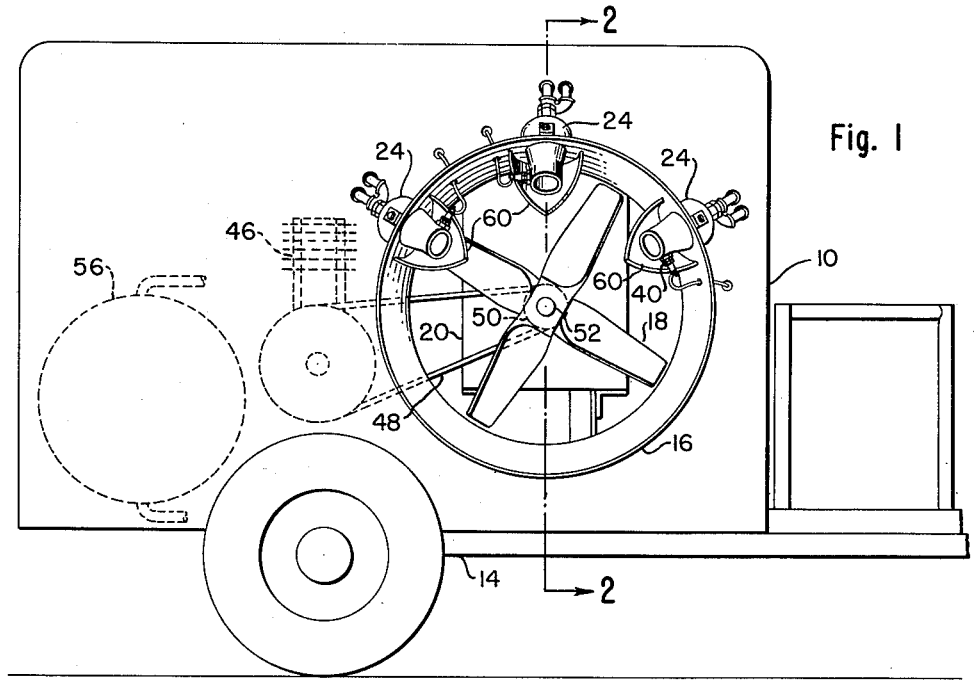
Figure 2:
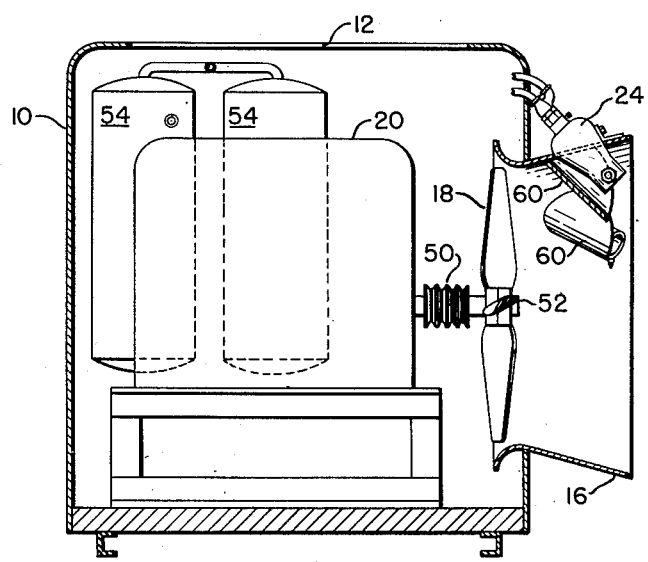
Figure 3:
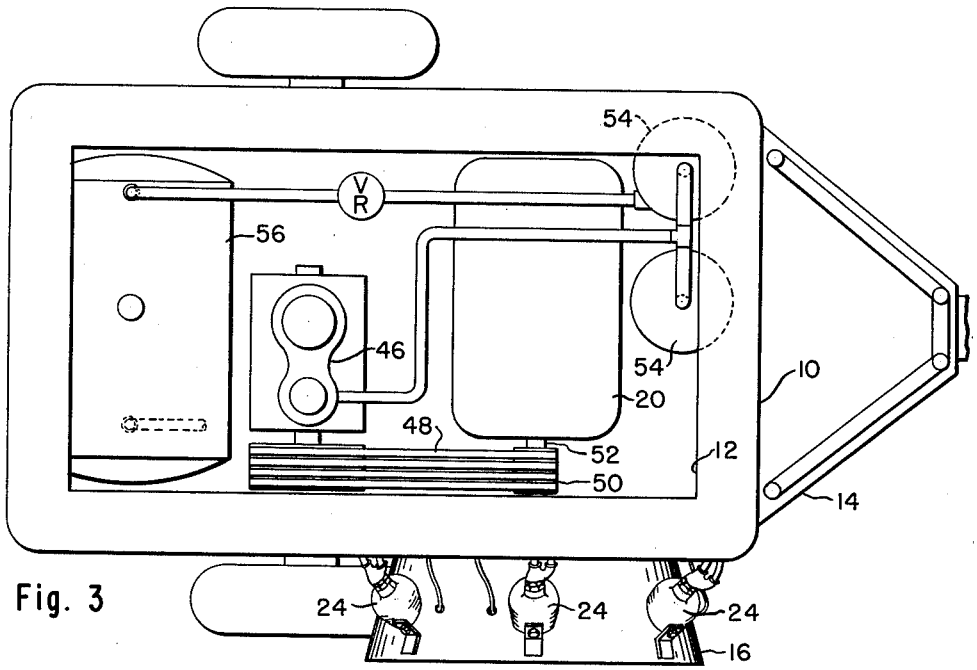

In the drawings illustrating the invention according to a preferred embodiment, Fig. 1 is a view in side elevation of an orchard heater mounted upon a trailer; Fig. 2 is a view in sectional elevation taken along the line 2—2 of Fig. 1; Fig. 3 is a top plan view of the apparatus of Fig. 1, and Fig. 4 is a detail sectional view showing a form of nozzle and combustion chamber that has been found effective for the intended purpose.

The apparatus comprises an enclosure or body 10 open at the top 12 and mounted upon a wheeled chassis 14 which is adapted to be connected to and towed behind a truck or tractor. In one wall of the body an opening is provided, having a shroud 16 within which a propeller fan 18 is located. The fan is driven by an internal combustion engine indicated generally at 20, the fan drawing in air through the open top of the body and discharging the air through the shrouded outlet in a generally horizontal direction and at relatively high velocity.

To provide for the release of heat at extremely high rates, fuel burning means are arranged to direct their flames into the air stream discharged from the fan. These means are in the form of combined nozzles and combustion chambers 24, and are mounted in the shroud ring 16 so as to discharge obliquely to the fan axis. As a result, the products of combustion are caused to at least partially traverse the air stream in the region of highest velocity and thereby become effectively mixed therewith, with the result that even at points relatively close to the apparatus in the direct path of the discharge excessively high temperatures are not encountered. This not only avoids the hazard of igniting combustible material that might lie in the path of the discharge, but it prevents injury to vegetation close to the apparatus.

Figure 4:
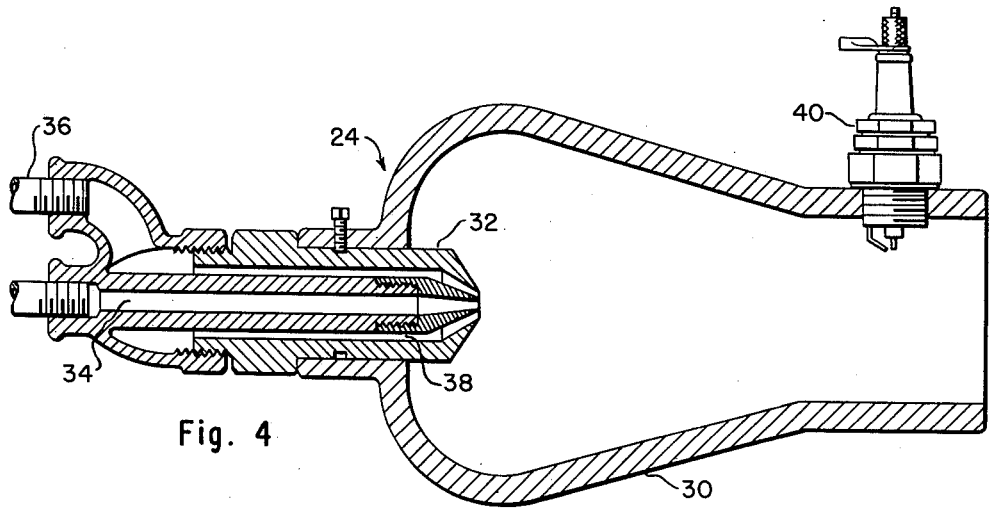

A suitable form of combination nozzle and combustion chamber is illustrated in Fig. 4, wherein a shell 30 of iron or other metal capable of withstanding elevated temperature is provided at one end with a suitable nozzle 32 for mixing liquid fuel and air supplied under pressure. Thus, fuel oil may be supplied to the central passage 34 at a pressure of the order of ten to twenty pounds per square inch, while air at a pressure of sixty to eighty pounds per square inch (by way of example merely) is supplied via pipe 36 to the annular passage 38 of the nozzle. For initial ignition of the fuel-air mixture, an electric spark discharge may be provided at the points of a conventional spark plug 40 adjacent the open end of the combustion chamber and supplied from the usual high tension ignition coil, not shown. As a rule, the spark discharge need be maintained only briefly, during the ignition period, after which the flame is self-maintaining within the combustion shell.

Air is supplied under pressure to the nozzles by means of a compressor 46 driven from the engine 20 by multiple belts 48 from a pulley 50 on the shaft 52 on which the propeller fan is mounted. Storage cylinders 54 are connected in the supply line between compressor and nozzles for pressure regulation and to provide a supply of air under pressure for starting the burners when the apparatus goes into operation. Suitable piping and control valves, not illustrated, connect the compressor, storage cylinders, and nozzles.

Liquid fuel is supplied under pressure to the nozzles from tank 56 by any suitable means, as by air at reduced pressure introduced at the top of the fuel tank via piping and a reducing valve from the storage cylinders.

As has already been indicated, operation at extremely high heat outputs and air velocities presents a serious problem of flame maintenance. According to the present invention, this difficulty has been overcome through the provision of shields or baffles 60, arranged slightly upstream from the combustion chambers and approximately spade-like in shape. These shields effectively divert the air blast from the combustion chambers so as to prevent excessive chilling of the walls thereof. Indeed, when arranged and shaped substantially as shown, these baffles or shields permit a small amount of eddying of the flame to take place rearwardly around the outside of the combustion shell to insure that the shell will quickly become and be maintained at an elevated temperature during operation. As a result, the flames may be well established before becoming exposed to the air blast from the fan and the possibility of snuffing out is substantially eliminated. Furthermore, due to the completeness of combustion, there is no danger of discharging unburned droplets of fuel oil onto the vegetation or fruit crop.

By reason of the disposition of the nozzles in or adjacent the shroud ring above the center line of the fan, in conjunction with their oblique orientation, an appreciable downward component of discharge of the hot gases is achieved, while at the same time introducing the gases into substantially the region of maximum velocity of the air from the fan. Tests conducted with the apparatus in the winter, with snow on the ground, have revealed that the heated air blast closely approaches and is effective at the surface of the ground, and this effect is manifest for an extended distance out from the apparatus. As a result, protection is afforded to low-lying crops, as well as to fruit in trees.

By way of example, it has been found effective, in combatting frosts, to provide a fuel rate of the order of sixty gallons an hour and upwards, so as to provide a heat output of roughly twenty million B. t. u. per hour, and greater. Such a heat output, available in the form of large volumes of warmed air, has proved highly successful in protecting orchards against freezing. Appreciable rises in temperature have been obtained in orchards of considerable extent, by operating the unit through the night while drawing the trailer slowly around and through the orchard.

If desired, the apparatus may be operated in conjunction with smoke smudging, either by separate pots or by introducing finely divided particles or droplets into the air stream from the fan.

While the invention has been illustrated and described in terms of a specific and preferred embodiment thereof, it will be understood that the invention is not necessarily limited to the precise arrangement shown, but comprehends other constructions, embodiments and arrangements within the scope of the appended claims.

Having thus described the invention, I claim:

1. An orchard heater comprising a propeller fan, means for driving the fan, a shroud ring for said fan, and fuel burning means mounted in said shroud ring, said fuel burning means comprising combustion chambers of generally cylindrical shape, having nozzles therein, said chambers projecting through the shroud ring into the path of the air stream from the fan, and shielding means embracing the combustion chamber in spaced relation on the upstream side of said chamber for diverting the high velocity air from said chamber while permitting eddying of the flame to take place between the shield and the chamber.

2. An orchard heater comprising a propeller fan, means for driving the fan, a shroud ring in close peripheral relation to the fan and extending forwardly thereof, fuel burning means mounted forwardly of said fan in the path of the air stream therefrom, said fuel burning means comprising generally cylindrical combustion chambers having nozzles therein and means for initiating combustion within said chambers, the chambers projecting inwardly through said shroud ring at an angle oblique to the discharge axis of the fan, and individual shielding means embracing the combustion chambers in spaced relation on the upstream side thereof for diverting the direct blast of air of the propeller fan from the outer wall of the combustion chambers, said shielding means adjacent the shroud ring being wider than the combustion chamber, and tapering to a termination inwardly of the innermost portion of said chamber.

RAY B. DAVIS.

REFERENCES CITED

The following references are of record in the file of this patent:

UNITED STATES PATENTS

| Number | Name | Date |
|---|---|---|
| 1,357,314 | Cobb | Nov. 2, 1920 |
| 2,041,969 | Seymour | May 26, 1936 |
| 2,153,900 | Taber | Apr. 11, 1939 |
| 2,289,675 | Ofeldt | July 14, 1942 |
| 2,315,096 | Sanderson | Mar. 30, 1943 |
| 2,465,712 | Clarkson | Mar. 29, 1949 |